United States Patent [19]

Leleu et al.

[11] Patent Number: 5,088,917
[45] Date of Patent: Feb. 18, 1992

[54] GAS ELECTROBURNER WITH ELECTRIC POWER SUPPLY AND ASSISTED IGNITION

[75] Inventors: Serge Leleu, La Grande Paroisse; Jean-Luc Aschard, Moret-Sur-Loing; Alain Bouvier, Fontainebleau, all of France

[73] Assignee: Electricite De France, Piars, France

[21] Appl. No.: 531,387

[22] Filed: Jun. 1, 1990

[51] Int. Cl.⁵ .................................................. F23Q 7/06
[52] U.S. Cl. .................................. 431/266; 431/182
[58] Field of Search ............ 431/2, 8, 9, 18, 182, 431/254, 256, 265, 264, 266; 315/111.41; 313/125

[56] References Cited

U.S. PATENT DOCUMENTS 2,006,593  7/1935  Goldman .......................... 431/265
3,490,856  1/1970  Temple ............................ 431/264 X

FOREIGN PATENT DOCUMENTS 1140862  1/1962  United Kingdom ............... 431/265

*Primary Examiner*—Carl D. Price
*Attorney, Agent, or Firm*—Larson & Taylor

[57] ABSTRACT

A gas burner comprises an annular air delivery duct axis, connected to an air supply for delivering a rotating air stream to a combustion chamber. A device injects fuel gas into said combustion chamber along the axis of said annular delivery duct. An arc is formed in the combustion chamber between an upstream electrode along the axis of the annular delivery duct and a counter electrode placed downstream of the upstream electrode. The upstream electrode and counter electrode are connected to an electrical current source. A deflector plate is placed in the path of the air stream at a location close to the upstream electrode. An arc ignition voltage across said upstream electrode and said deflector may be applied.

7 Claims, 3 Drawing Sheets

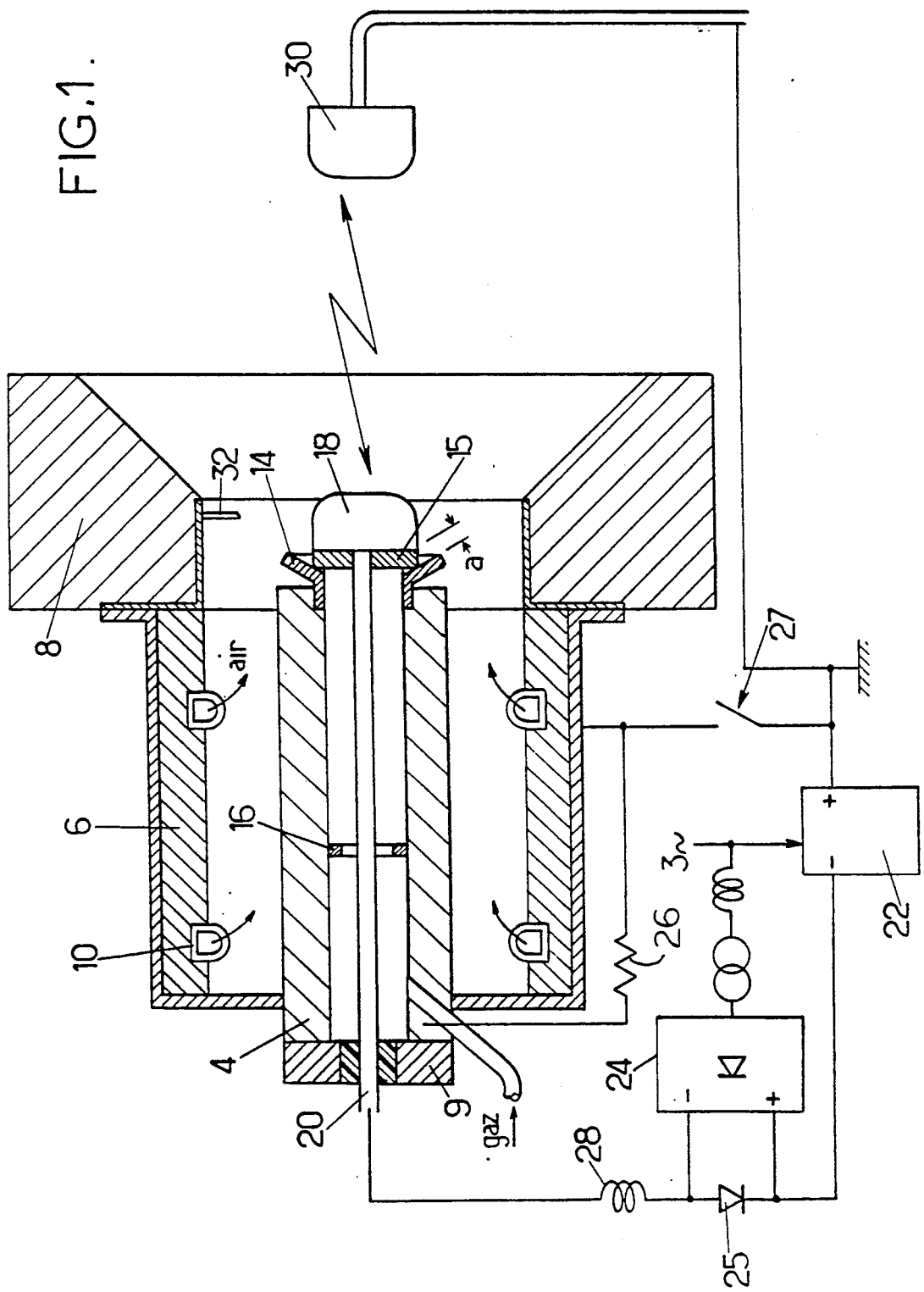

GAS ELECTROBURNER WITH ELECTRIC POWER SUPPLY AND ASSISTED IGNITION

BACKGROUND OF THE INVENTION

1. Technical field

The invention relates to gas burners with electric power supply, of the type comprising a device for injecting fuel gas along the axis of annular delivery means delivering a rotating air stream and further comprising an upstream electrode and a counter electrode connected together via a main current source, placed in a burnt gas reception chamber, an upstream electrode being placed along the axis of the annular means and arranged for creating an energy supply arc through the flame of the burner.

2. Prior Art

Such an electroburner is described in French patent No. 2,577,304. It may be made with only limited structural modifications to the construction of a conventional gas burner. In addition to the modified burner, it comprises means placed on the gas injection device, particularly including an injector nozzle forming an electrode, and a high voltage generator for creating a corona between a central electrode, connected to the upstream electrode, and the injection nozzle in which the gas reaches a supersonic speed.

SUMMARY OF THE INVENTION

While such a construction gives satisfactory results, it is complex. It is an object of the invention to simplify the material construction of the burner and also that of its electric supply circuits.

For this, there is provided a gas burner of the above-defined type comprising a deflector plate placed in the path of a combustion air stream, close to the upstream electrode, and means providing an arc ignition voltage across the upstream electrode and the deflector.

With this arrangement, the injector nozzle of the device according to French No. 2,577,304 can be omitted.

To reduce the ignition voltage, the deflector is advantageously formed as an electrically conducting disk having a surface confronting the upstream electrode and at a distance therefrom between 1 and 3 mm. A voltage of a few thousand Volts is then sufficient to cause ionization and initiate discharge. With this system the gas can be ignited with the combustion air.

A relay electrode, or several, may be provided between the deflector, forming a striking electrode, and the counter electrode on which the discharge must remain on steady operation, to facilitate the passage of the arc from one to the other. The relay electrode (or each relay electrode) may be formed as a metal projection carried by the wall of the chamber and brought to the same potential as the counter-electrode.

The main current source, capable of delivering a high intensity at a relatively low voltage is typically a main DC current source placed in series with an auxiliary supply source, delivering a high voltage off load, but only supplying a very low voltage when a large current flows therethrough. The main source and the auxiliary source are placed in series relation in a circuit which is closed, on the one hand, by the upstream electrode and, on the other hand, by the deflector (possibly via a current limitation resistor) and by the counter-electrode.

This arrangement has the advantage among others, of providing arc stability under steady operation, since any appreciable reduction of the current results in a rise of the voltage delivered by the auxiliary supply source; this auxiliary source may however be cut off if the arc stability is sufficient, which reduces the reactive power of the assembly.

In a modification, the counter-electrode, placed downstream of the upstream electrode, may be displaced. Thus start-up may be ensured from a short circuit condition between the two electrodes. This arrangement makes it possible to further simplify the system, by omitting the auxiliary starting supply and the relay electrodes.

The two electrodes (particularly the upstream electrode) are advantageously provided with magnets and flux return yokes of ferro-magnetic material, in an arrangement which generates a magnetic field causing arc rotation, which makes wear of the electrodes more even.

BRIEF DESCRIPTION OF THE DRAWINGS

The invention will be better understood from the following description of A particular embodiment and of modifications, given by way of non-limiting examples. The description refers to the accompanying drawings, which:

FIG. 1 is a simplified diagram of a burner according to an embodiment of the invention or in cross-section through a plane passing through the axis thereof;

DETAILED DESCRIPTION OF THE INVENTION

Figure 2:
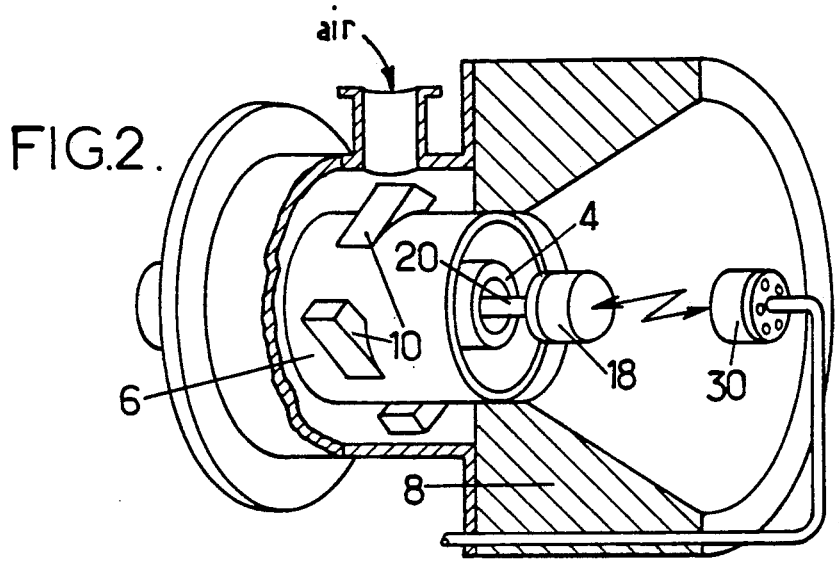
FIG. 2 is a perspective view showing the relative arrangement of the components of the burner of FIG. 1.

The burner shown schematically in FIGS. 1 and 2 comprises a gas injection device 4 placed ALONG the axis of annular combustion air feed means and having a feed duct 9. The annular means comprise a body 6 which comprises nozzles 10 for tangentially feeding combustion air, inparting to the air flow a rotation about the axis of the injection device 4. Body 6 is connected to a chamber 8, generally of refractory material which defines a combustion chamber in which the flame develops. This chamber has a flared inner shape, for example a frusto-conical shape which channels the gas streams and promotes mixing.

The gas injection device 4 comprises, at its downstream end, a disk-shaped deflector 14 with a diameter close to that of the backflow core of the swirling airflow induced by nozzles 10. The purpose of deflector 14 is to prevent the hot gas from flowing back around the injection device and to stabilize the gas streams leaving the injection device, and so the flame.

The components of the burner described up to now are similar to those described in French patent No. 2,577,304, already mentioned.

On the other hand, the gas injection device shown in FIG. 2 is devoid of those nozzles for giving a supersonic speed to the gas at the throat, which were used for starting the burner in the prior art. But a diaphragm 16 will generally be provided for limiting the gas flow.

The burner comprises an upstream electrode 18 placed in front of the deflector 14 and carried by a current feed tube 20 which passes through the bottom wall of injection device 4.

Figure 6:
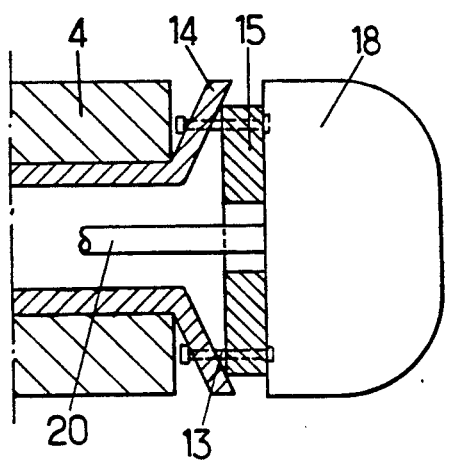
FIG. 6 is a detail view, on an enlarged scale of the deflector-upstream electrode unit of the burner of FIG. 1, in cross-section along an axial plane.
Figure 7:
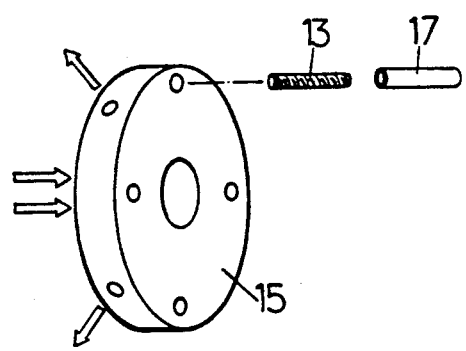
FIG. 7 is an exploded view, in perspective, of the insulating ring of FIG. 6 and of its connection means.

Deflector 14 is electrically insulated from electrode 18 by an insulating ring 15 (FIG. 6). As shown in FIG. 7, the ring is formed with holes, for the passage of gas. The unit 14, 15, 18 is assembled mechanically by stud bolts 13 sheathed in an electrically insulating tube 17 (FIG. 7).

The distance a between the rear face of the upstream electrode 18 and the deflector disk 14 is given a sufficiently small value for an arc to be stricken therebetween under a voltage of a few thousand volts: in practice, a will often be of from 1 to 1.5 mm, allowing striking to take place at about 3000 V. This distance, which is relatively small is advantageously maintained by the above-described mechanical connection system.

Means for providing the arc striking voltage between upstream electrode 18 and deflector disk 14 include, in the embodiment illustrated in FIG. 1, a main DC current source and an auxiliary source, placed in series relation. The main source is formed as a power rectifier 22, capable of delivering an adjustable current, at a voltage of a few hundred volts. In practice, a rectifier 22 may for example be used whose rated current and output voltage are respectively 700 A and 500 V. The auxiliary source is formed by rectifier 24 associated with magnetically saturable means, so that it delivers a high voltage (for example 2500 V) when it does not deliver any current, and its output voltage collapses as soon as it delivers current. A source may in particular be used, which can deliver 30 A in short-circuit, i.e. at practically zero voltage, and a few thousand volts when not delivering current. A diode 25 may be provided for by-passing rectifier 24 when a reverse current tends to flow therethrough.

The circuit for forming an arc between the deflector disk 14 and the electrode 18 comprises, from the gas injection device 4 (connected electrically to the deflector disk), a current limiting resistor 26, sources 22 and 24 and an inductance 28 whose purpose is to reduce the instabilities by delivering, during transitory periods, energy which is opposed to extinction of the arc. This inductance may have a value less than that which would be necessary for avoiding the risk of extinction in a device having no auxiliary source, for the latter intervenes to provide the arc holding overvoltage required if the arc current intensity becomes too low. In practice, an inductance of 5 to 10 milli-Henry will be generally sufficient.

The terminal of the main source 22 which is connected to injection device 4 by resistor 26 is grounded and is also connected to the casing of body 6 and to the counter-electrode 30, alined with the upstream electrode 18. It can be seen that the two sources are placed in series in the arc forming and holding circuit between the upstream electrode 18 and the counter-electrode 30.

The burner comprises a relay electrode 32 connected electrially to the casing of body 6 and so to ground, which may be formed by simple metal projection 32.

Operation of the burner is as follows:

To start the burner, it is supplied with air and gas and the main source 22, then the auxiliary source 24 are connected to the network arc strikes between the upstream electrode 18 and the deflector disk 14, with a current limited by resistor 26. A gas stream (hydrocarbons for example) sent into the injection device by duct 9 blows the arc and transfers the arc foot, in a first stage, from the deflector disk 14 to the relay electrode 32, then, in a second step, to the counter-electrode 30. It should be noted that the striking arc does not appear inside the injection device 4, which is frequently made from graphite. There is consequently no removal of carbon and no wear of the insulating ring 15.

Once the arc has been transferred to the counter-electrode 30, operation is steady. Under stable operating condition, the main source 22 delivers, for example, a current of 700 A at 500 V. The electric source 24 is then practically short-circuited and plays no role.

Figure 3:
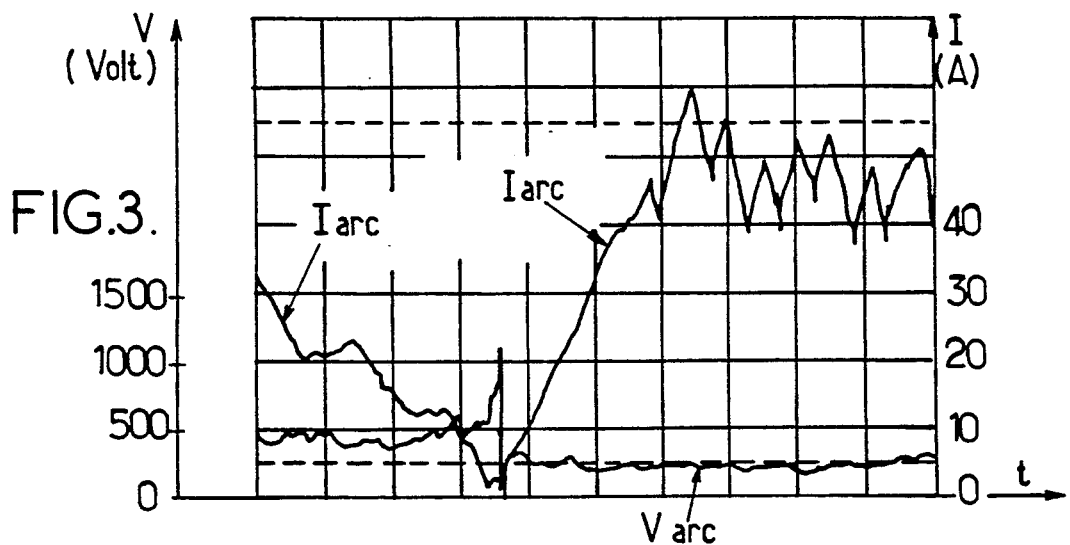
FIG. 3 is a diagram showing the variation of the values of the arc current Iarc and of the arc voltage Varc as a function of time, under operating conditions representative of disturbances.

If arc instability appears, inductance 28 comes into play and provides additional energy. If it is insufficient, the auxiliary source 24 delivers the required overvoltage. As illustrated in FIG. 3 (corresponding to a circuit with an inductance of 1.5 mH), it can be seen that the arc voltage Varc increases rapidly as soon as current oscillations appear which might cause arc extinction.

The auxiliary source 24 has two functions: it facilitates striking and it stabilizes the arc and allows a lower value of the necessary inductance, thus a lower cost of the corresponding component.

Figure 8:
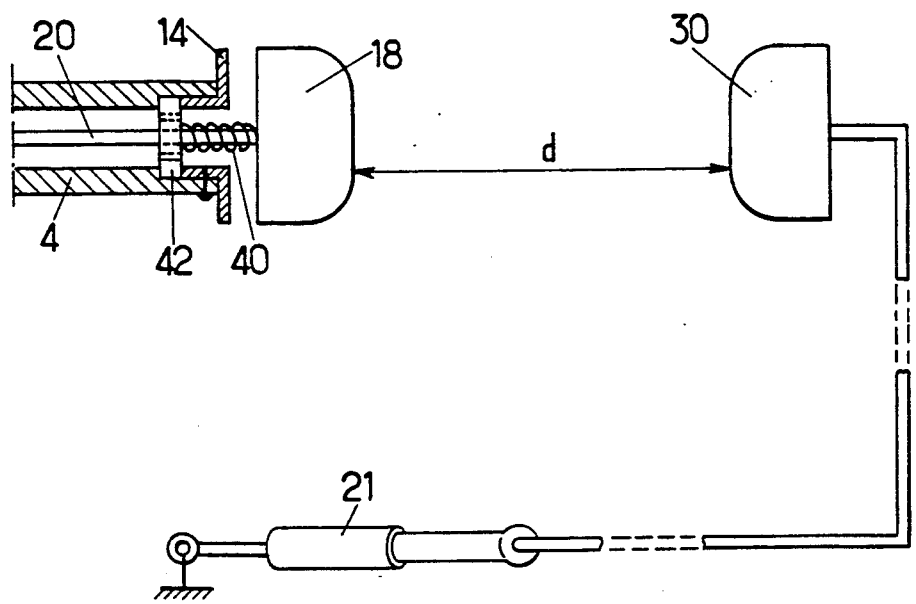
FIG. 8, similar to a fraction of FIG. 1, shows a modification.

In a modification of the burner-electric supply unit, shown in FIG. 8, the counter-electrode 30 may be moved. In FIG. 8, the means for moving the electrode is a jack 21 with position servo-control enabling to start the electroburner in short circuit. The modification has advantages:

possible omission of the auxiliary high voltage supply 24 for starting;

removal of resistor 26 and relay electrode 32;

no need to accurately maintain the distance between deflector 14 and electrode 18 (since starting of the arc no longer takes place between these two parts);

for a predetermined current intensity I, possibility of adjusting the set operating voltage U (and so the power P=UI) by varying the distance d between the two electrodes, since U increases in proportion of d, all other things being equal.

To avoid damaging the two electrodes when in short-circuit, a damping spring 40 (FIG. 8) may for example be placed on the rod 20 of the upstream electrode 18 which abuts against the sliding ring 42 of rod 20. This ring is secured to the body of device 4 via deflector 14. It is apertured to allow gas flow therethrough.

It is desirable to cause the arc foot to move over electrodes 18 and 30 to avoid rapid destruction of the latter. The arrangement shown in FIGS. 4 and 5 creates, by means of permanent magnets, electromagnetic forces for rotating the arc foot.

Figures 4, 5:
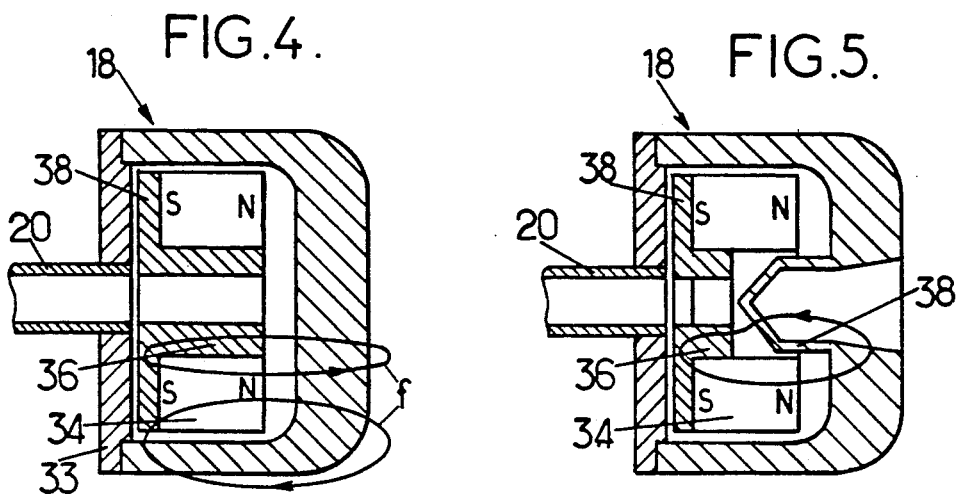
FIGS. 4 and 5 are diagrams showing possible arrangements of magnets for creating a magnetic field causing movement of the arc foot, an electrode of the burner shown in FIGS. 1 and 2.

In the embodiment shown in FIG. 4, electrode 18 comprises a cup-shaped electrode body closed by a bottom wall 33. The body and the bottom wall may be of good conductor material, for example copper cooled by a fluid flow. The chamber defined by the body and the bottom accomodates magnets 34 carried by soft iron cores 36 and 38 forming a yoke. That set creates a magnetic field whose flux lines have the pattern shown by lines f in FIG. 4 and which causes the arc foot to rotate about the axis of the electrode.

Core 38, in the form of a disk, not only causes the arc foot to rotate but also prevents it from permanently remaining on the rear part of the electrode; core 36 "rejects" the arc foot if it moves towards the center of the electrode.

In some burners, disturbances (for example instabilities due to mouvements of the gases) may lead the arc foot to reach a central position on electrode 18: then it will remain there, for the position is stable and there will be fast wear of the central portion of the electrode.

The modified construction of electrode 18 shown in FIG. 5 (where elements corresponding to those of FIG. 4 are designated by the same reference number) removes the risk. In the electrode of FIG. 5, the body has a central hollowed out portion 38 and the tubular core 36 is shortened. A mathematical model of the field lines shows that the arc foot is automatically pushed back outside by Laplace's forces if it tends to penetrate into the hollow portion 38.

The invention is not limited to the particular embodiments which have been described by way of examples and it should be understood that the scope of the present patent extends to modifications remaining within equivalences.

What is claimed is:

1. Gas burner comprising:
    annular air delivery means having an axis and being connected to an air supply for delivering a swirling air stream at an outlet thereof to a combustion chamber,
    a device for injecting fuel gas into said combustion chamber along the axis of said annular delivery means,
    means for striking an arc across gases resulting from combustion of said fuel gas, said striking means having an upstream electrode along the axis of the annular delivery means and a counter electrode placed downstream of the upstream electrode, said upstream electrode and counter electrode being connected to a main electrical current source,
    a deflector plate placed in the path of the air stream at a location close to the upstream electrode,
    means providing an arc ignition voltage across said upstream electrode and said deflector plate, and
    at least one relay electrode located between said deflector plate and said counter electrode.

2. Burner according to claim 1, wherein said relay electrode comprises a metal projection carried by a wall of a chamber receiving combustion gas and brought to the same electrical voltage as the counter electrode.

3. Gas burner comprising:
    annular air delivery means having an axis and being connected to an air supply for delivering a rotating air stream at an outlet thereof to a combustion chamber,
    a device for injecting fuel gas into said combustion chamber along the axis of said annular delivery means,
    means for striking an arc across gases resulting from combustion of said fuel gas, said striking means having an upstream electrode along the axis of the annular delivery means and a counter electrode placed downstream of the upstream electrode, said upstream electrode and counter electrode being connected to a main electrical current source,
    a deflector plate placed in the path of the air stream at a location close to the upstream electrode, and
    means for providing an arc ignition voltage across said upstream electrode and said deflector plate,
    wherein said main current source comprises a series arrangement of a main DC current source and an auxiliary supply source, said auxiliary supply source being constructed to deliver a high voltage when off load and to supply a very low voltage as compared with said high voltage when delivery a large current.

4. Burner according to claim 3, wherein said main DC current source and said auxiliary supply source are in series relation in a circuit having a terminal connected to the upstream electrode and another terminal connected to said deflector and to said counter electrode.

5. Burner according to claim 4, wherein a current limiting resistor is located between said other terminal and said deflector.

6. Burner according to claim 5, wherein one at least of said electrodes is provided with ferromagnetic means located to generate a magnetic field having flux lines causing rotation of a foot of the arc on the respective electrode.

7. Burner according to claim 6, wherein said electrode has a central recess located to prevent the arc foot from remaining along the axis.

* * * * *